No. 861,858. PATENTED JULY 30, 1907.
A. JOHNSON.
FEEDING HOPPER.
APPLICATION FILED JULY 27, 1906.
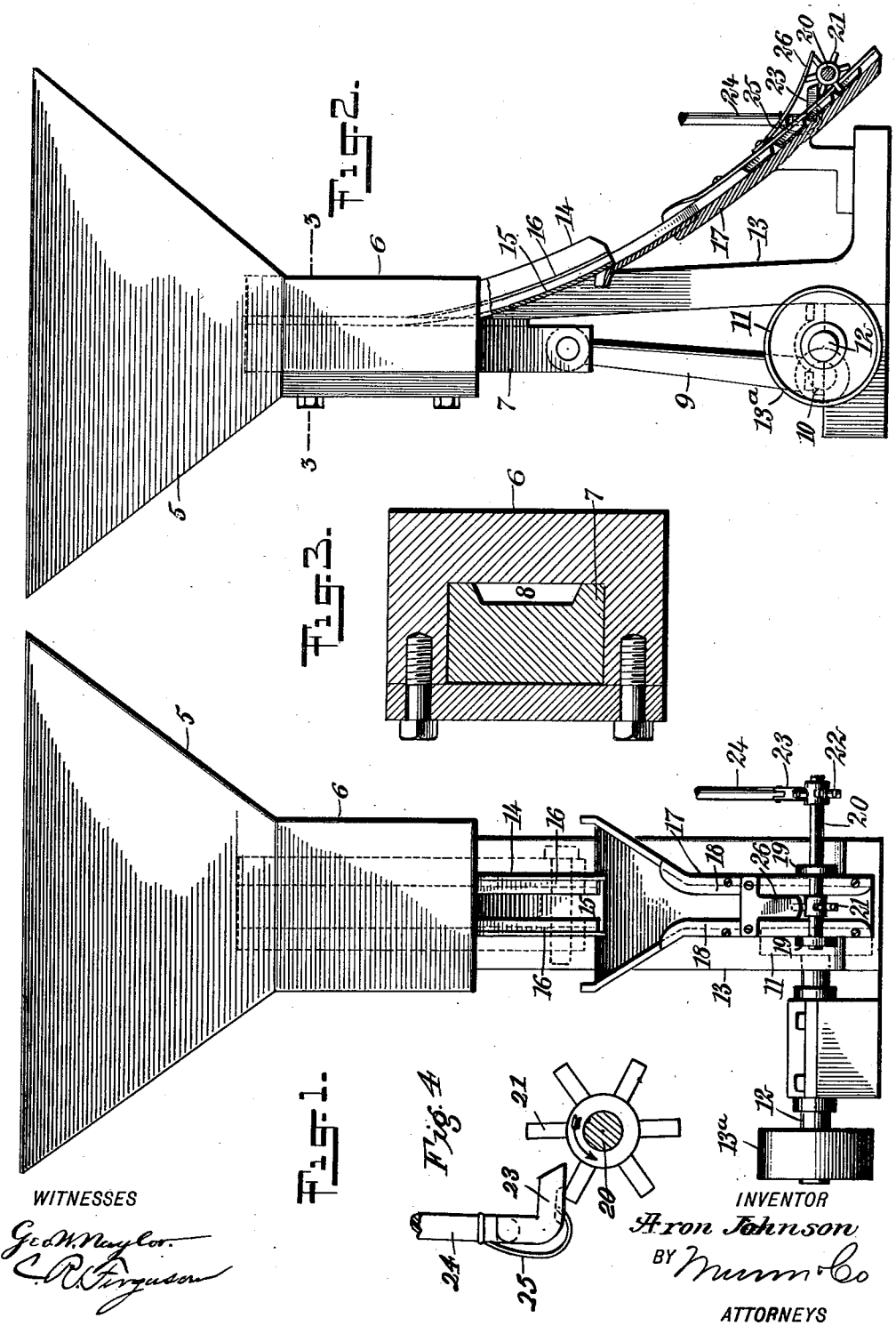

UNITED STATES PATENT OFFICE.

ARON JOHNSON, OF NEW YORK, N. Y.

FEEDING-HOPPER.

No. 861,858.   Specification of Letters Patent.   Patented July 30, 1907.

Application filed July 27, 1906. Serial No. 328,081.

*To all whom it may concern:*

Be it known that I, ARON JOHNSON, a citizen of the United States, and a resident of the city of New York, borough of Brooklyn, in the county of Kings and State of New York, have invented a new and Improved Feeding-Hopper, of which the following is a full, clear, and exact description.

This invention relates to improvements in hoppers for feeding metal crowns or caps for bottles or other articles having inclined walls of gradually increasing diameter, to an assembling table. The object being to provide a device of this character so constructed as to direct and deliver the articles open side, or right side upward, for receiving cork disks therein, thus obviating the necessity of manually turning the crowns, therefore saving considerable time in the assembling of parts.

I will describe a feeding hopper embodying my invention and then point out the novel features in the appended claims.

Reference is to be had to the accompanying drawings, forming a part of this specification, in which similar characters of reference indicate corresponding parts in all the figures.

Figure 1 is a front elevation of a feed hopper embodying my invention; Fig. 2 is a side elevation thereof partly broken away and in section; Fig. 3 is a section on the line 3—3 of Fig. 2; and Fig. 4 is a view on an enlarged scale, partly in section, of a detail of construction.

Referring to the drawings, 5 designates a main hopper in which the crowns or like articles are to be placed, and connected to the lower portion of the hopper is an extension 6, having a vertical opening in which a carrier 7 reciprocates. At its front side the carrier 7 is longitudinally channeled as indicated at 8, the side walls of which are tapered and conformed to the article designed to be received therein. A pitman 9 is connected at one end to the lower end of the carrier, and at its other end the pitman connects with a wrist-pin 10 on a crank wheel 11 mounted on a driving shaft 12, which as here shown, has a band-wheel 13ª; but obviously, the crank wheel may be driven by any other means. The hopper, as here shown, is supported by a standard 13, and extended downward from the extension 6 is a chute 14 which is longitudinally curved, and the bottom is formed by a sheet metal plate 15 which, at the upper end engages closely against the inner wall of the recess 8; the chute 14 is open at the front, and extended inward from its side walls are flanges 16, between which and the plate 15, crowns or the like are designed to slide to the assembling table.

In the operation, the crowns or the like are placed in the hopper 5 and as the carrier 7 moves upward therein, it will agitate the crowns, and a crown at the lower portion, that may be in the right position—or with its smaller portion inward—will pass into the recess 8, and then, as the carrier moves downward the crown will be discharged into the chute 14 and slide downward therein, to the assembling table, the articles however, first passing through a guide chute 17 widened at its upper portion and which is downwardly inclined and has at its upper side, opposite inwardly extended flanges 18 to prevent the crowns or the like from falling outward.

Arranged at opposite sides of the guide chute 17 near the lower end, are bearings 19 for a shaft 20, which carries a stop device for the crowns; that is, to prevent the discharge of more than one crown at a time. This stop device consists of a plurality of radial fingers 21 secured to the shaft and extended into the chute 17; these fingers are so spaced that when releasing one crown a one-stop rotary movement of the shaft will cause the next finger to pass into the second crown as illustrated in Fig. 2, thus holding all the crowns in the chute until the said second crown is to be discharged onto the assembling table.

On the outer end of the shaft 20 are radial tappet fingers 22, which are equal in number to the fingers 21, and are in alinement therewith. These tappet fingers 22 are designed to be engaged by a tappet arm 23 which is of angular form and has pivotal connection with a rod 24 designed to be moved up and down by any suitable connection with the machine upon which the present invention is mounted. This tappet arm 23 is pressed against a shoulder at the end of the rod 24 by means of a spring 25 engaging its under face, causing the arm to normally assume a horizontal position. It is obvious from this construction that the arm 23 can be moved relatively to the rod from the position shown in Fig. 2 downwardly against the tension of the spring 25 only. It is thus seen that when the arm is in engagement with a tappet finger, the said arm will be practically rigid with relation to the rod 24; but upon upward movement of said rod, the finger will yield so as to pass over the tappet finger next to be operated upon. The stop fingers 21 are held or retarded from movement too far by means of a spring 26 secured to the chute 17 and bearing upon the stop device.

Having thus described my invention, I claim as new, and desire to secure by Letters Patent:

1. In a device for the purpose specified, a hopper, a hollow extension from the bottom thereof, a carrier in said extension, and having a recess, the side walls of which are inclined, means for causing reciprocating motion of said carrier in said extension and into the hopper, a chute leading from said extension, and inwardly extended flanges on the side walls of the said chute.

2. In a device for the purpose specified, a hopper, a hollow extension in the bottom thereof, a carrier arranged in said extension, and having a recess, the side walls of which are tapered, means for causing the movements of said carrier, a longitudinally curved chute leading from said extension, the said chute being open at the front, and flanges extended inward from the side walls of the chute.

3. In a device for the purpose specified, a hopper, a reciprocating carrier arranged in the hopper, a feed chute for receiving material from said carrier, a shaft extended across said feed chute, radial stop fingers on said shaft, and extended into the feed chute, and means for imparting step-by-step rotary movement to said shaft.

4. In a device for the purpose specified, the combination with a hopper and a carrier for operating in the hopper, of a feed chute, a shaft extended across the feed chute, stop fingers on said shaft and extending into the chute, radial tappet fingers on the shaft, and a spring-yielding tappet arm for engaging with said tappet fingers, to impart step-by-step rotary movement to the shaft.

In testimony whereof I have signed my name to this specification in the presence of two subscribing witnesses.

ARON JOHNSON.

Witnesses:
 JNO. M. RITTER,
 C. R. FERGUSON.